July 8, 1924.
W. F. HALL
1,500,990
METHOD OF CUTTING MATERIAL FOR BUFFING WHEELS
Filed Sept. 26, 1921
2 Sheets-Sheet 1

Inventor
Wesley F. Hall
By his Attorneys
Prindle, Wright & Purnall

July 8, 1924.  
W. F. HALL  
METHOD OF CUTTING MATERIAL FOR BUFFING WHEELS  
Filed Sept. 26, 1921   2 Sheets-Sheet 2

1,500,990

Wesley F. Hall  Inventor
By his Attorneys
Prindle, Wright & Vinall

Patented July 8, 1924.

1,500,990

UNITED STATES PATENT OFFICE.

WESLEY F. HALL, OF MATAWAN, NEW JERSEY, ASSIGNOR TO A. P. MUNNING & CO., OF NEW YORK, OF NEW YORK, N. Y., A CORPORATION OF NEW JERSEY.

METHOD OF CUTTING MATERIAL FOR BUFFING WHEELS.

Application filed September 26, 1921. Serial No. 503,411.

*To all whom it may concern:*

Be it known that I, WESLEY F. HALL, a citizen of the United States, residing at Matawan, in the county of Monmouth and State of New Jersey, have invented a certain new and useful Method of Cutting Material for Buffing Wheels, of which the following is a specification.

The invention relates to the manufacture of polishing or buffing wheels such as are made from linen, canvas, flannel, felt, or similar material in sheet form, cut to suitable size and shape, and assembled in layers or plies to make up a wheel of the desired diameter and thickness.

The invention has for an object to cut sheet material into pieces in such manner that, although the pieces are of a shape suitable to be assembled to make up a complete circular buff, they nevertheless may be obtained without producing waste fragments left over after the pieces are cut from a large sheet; thus the material of a sheet all may be usefully employed.

When the invention is employed in connection with woven material I prefer to cut out the pieces so with reference to the warp and weft that the cutting edge of each piece is inclined to both the warp and the weft, and thus the working surface of the wheel will be composed of the edges of the threads instead of their sides, thereby to minimize unraveling or fraying of the threads in use.

Further objects and advantages of the invention will be in part obvious and in part specifically pointed out in the description hereinafter contained, which, taken in connection with the accompanying drawings, discloses certain preferred embodiments of the invention; such embodiments, however, are to be considered merely as illustrative of its principle. In the drawings:

Fig. 1 is a view of a fabric sheet, indicating lines along which the sheet may be cut to obtain pieces adapted to be assembled to make up a buff wheel, in accordance with the invention.

Fig. 1ª is an edge view illustrating a method whereby several layers or lengths of a long sheet of material may be cut up simultaneously.

The fabrics from which buffing wheels of the above character are made, are usually obtained in the form of long rolls or sheets of standard widths, from which sheets the pieces are cut into proper form for assemblage to make up a circular buff wheel. If the rectangular sheet be cut into circular pieces or the like, it is obvious that, after the sheet is cut up, a large number of waste pieces of material will be left over owing to the fact that the circular pieces necessarily are spaced from each other at all points except a common point of tangency between adjacent circles, with the result that when a large sheet is cut up, a large number of waste fragments are produced. Thus the wastage of material, which easily may amount to 15% or 20% of the total area of the sheet, becomes a substantial factor in the cost of the wheel.

On the other hand, the pieces which are to make up the buff wheel should be capable of assemblage into a substantially circular form, without producing a wheel which will vary unduly in thickness, or which will have to be reduced in diameter an undue amount in order to make it true and accurately balanced, and of uniform cutting qualities throughout its periphery.

According to the present invention, the sheet of material from which the wheel is made, is so cut that there are no gaps between adjacent pieces, which would produce waste, and thus the full area of the sheet is usefully employed, nevertheless the pieces are of such shape that they may be assembled to make up a complete wheel which will be of substantially circular form and accurately balanced, and of uniform cutting qualities throughout its periphery. Thus the advantage is obtained of employing circular pieces to make up the wheel without the waste incident thereto.

Figure 1:
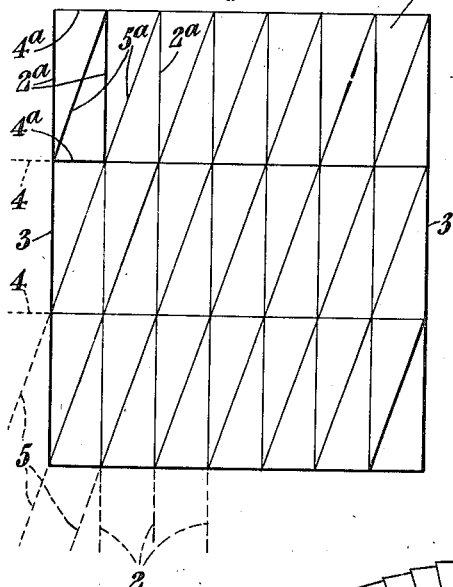
Figure 1A:
Figure 2:
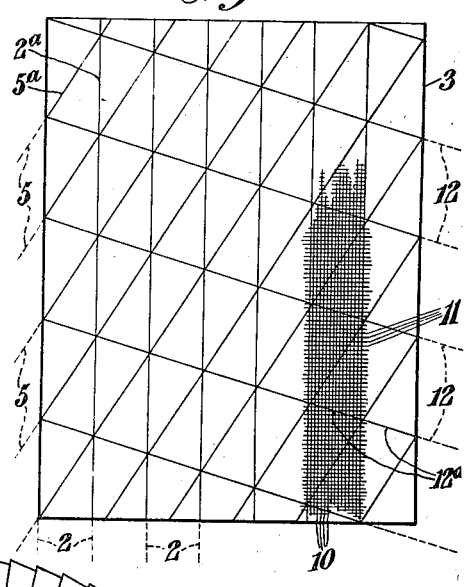
Fig. 2 is a view similar to Fig. 1, but illustrating a method of cutting up the material to obtain pieces having their working edges inclined to both the warp and weft of a woven sheet.

Referring to Fig. 1, I have illustrated a fabric sheet 1, which ordinarily will be obtained in the form of a roll many yards long. As indicated in Fig. 2, such a roll may be laid out in layers to enable several lengths of the material to be cut simultaneously by suitable dies or cutters, as hereafter is more fully described.

The sheet 1 is cut along a series of lines 2 parallel to one edge of the sheet, in the present instance the side edge 3, and also along a further series of parallel lines 4, at an angle to lines 2, thus forming parallelograms between lines 2 and 4 having sides 2ª and 4ª respectively. Ordinarily, where the pieces are desired to make up wheels of the same size, the spacing between all of the lines 2, and also between all of the lines 4, will be equal, and so chosen that the sheet 1 will be divided up into equal parallelograms which cover its entire area. In order to obtain pieces of proper shape to make up a circular wheel, the sheet 1 is also severed along a further series of lines 5 which divide up the parallelograms previously mentioned into polygons having diverging sides 2ª and 5ª respectively. In the form of the invention shown in Fig. 1, the lines 5 pass through the intersection points of the series of lines 2 and 4, thus cutting up the sheet into equal triangles, which utilize its full area.

Figure 3:
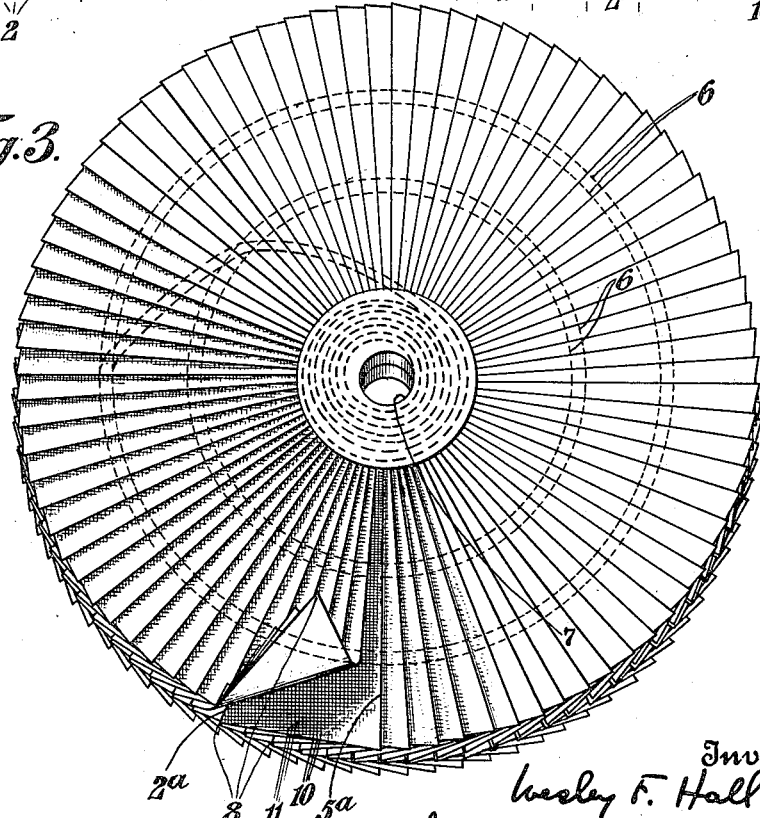
Fig. 3 is a perspective view illustrating a method by which pieces such as are indicated in Fig. 2, may be assembled to make up a complete wheel.

Thus the pieces formed by cutting a sheet along lines of the character above described are not separated by waste fragments, or, in other words, each division line 2, 4, and 5, as the case may be, defines a side of each of the adjacent pieces between which the line passes, and therefore the pieces are in contact throughout; nevertheless, a number of the pieces may be suitably assembled to form a wheel with their sides 2ª and 5ª extending in somewhat radial fashion, and due to the tapering shape of the pieces, any excess of material at the inner portion of the wheel will be avoided. Furthermore, the shape and dimensions of the pieces may be so chosen that no substantial wastage occurs when they are assembled to make up a circular wheel. The cutting edges of the pieces preferably will be placed substantially tangentially to the circle of the buff wheel, in which case the corners 8 of the pieces will project as shown in Fig. 3, in the first instance, and the wheel will not have a truly circular periphery until these corners are cut off. However, it ordinarily is not practicable to cut and assemble pieces of any shape so accurately as to form a wheel which is truly circular in the first instance, and therefore the wheels are usually trued up after being completed by cutting off the necessary amount of material from the working face to form an exact circle. I prefer to space the cutting lines in such manner that pieces are obtained which are relatively narrow so as to reduce the areas of the pieces which will have to be cut off before the wheel becomes exactly circular, thus reducing the amount of material used up in the truing up operation. In fact, the removal of material or reduction in diameter due to the truing up operation need not be greater with pieces cut out in accordance with the invention, than would be the case with other types of wheels, so that wheels made up of pieces cut out according to the invention are not inferior in this respect.

Figure 4:
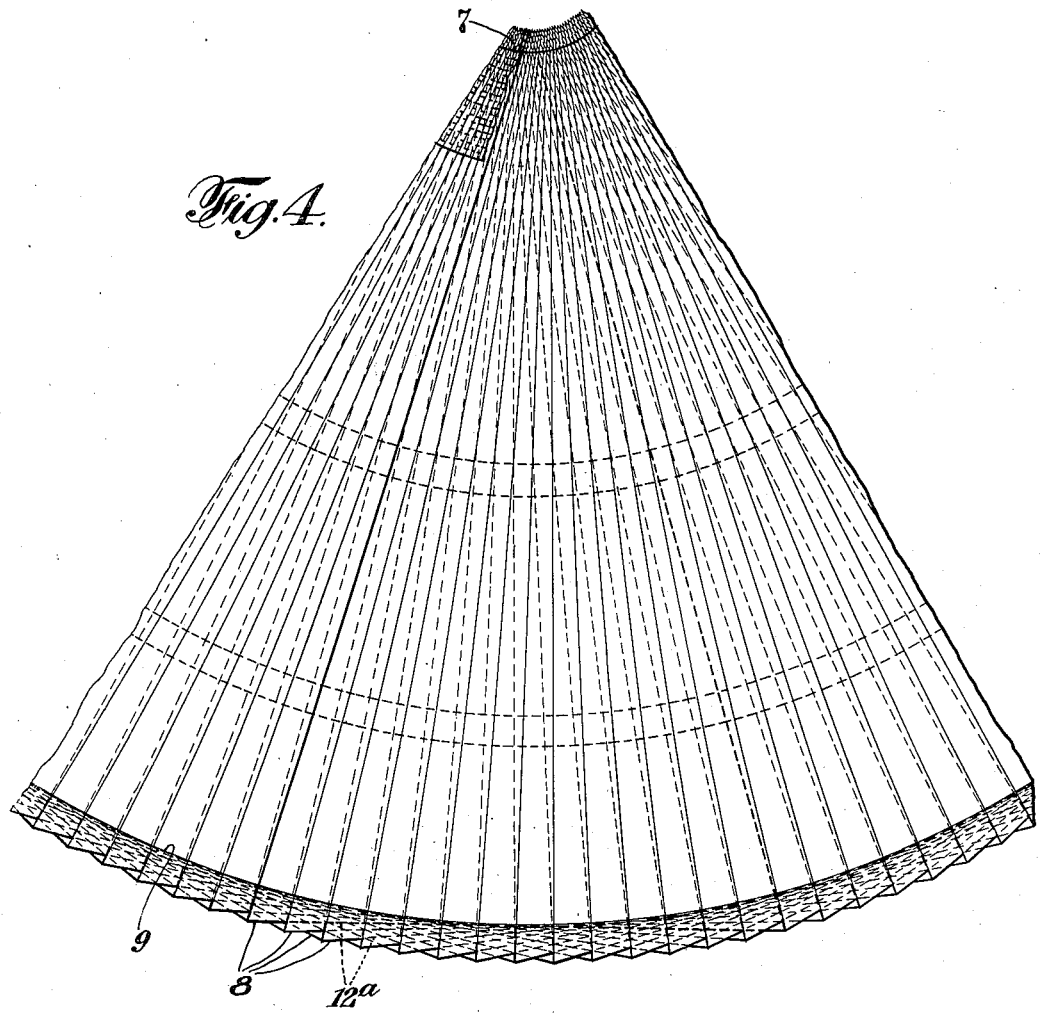
Figs. 4 and 5 are respectively a plan view and an edge view of a portion of the wheel shown in Fig. 3.
Figure 5:
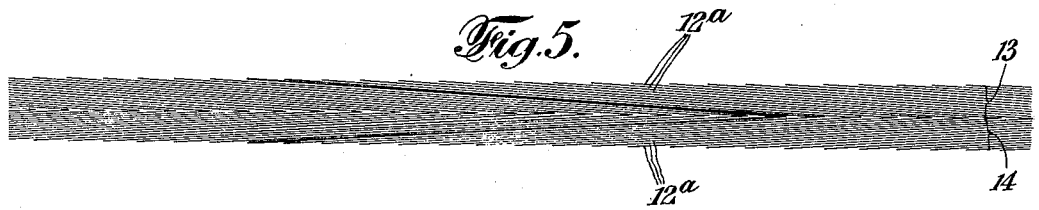

In Figs. 3 to 5 I have illustrated one method of making up a complete buffing wheel from pieces cut out in accordance with the invention, such wheel, however, not being claimed in the present application, but in my co-pending application Serial No. 503,410, filed September 26, 1921, entitled buff wheel, to which co-pending application reference is hereby made for a more complete description of the wheel. Briefly described, the wheel may be made up by employing a point for its centre which is at or slightly beyond the intersection points of the diverging sides of the pieces so that such sides extend out in radial fashion. The pieces are then laid down one over the other with each piece angularly stepped to overlap the piece underneath until a number of pieces have been assembled sufficient to complete the circle of the wheel. The pieces are bound together in any suitable manner, for example, by rows of stitching 6 (Figs. 3 and 4), and a circular hole 7 formed at the centre to enable the wheel to slip over a spindle.

In some instances, particularly where the wheel is to be made up of woven material, I prefer to cut the pieces in such manner that their working edges will be oblique to both the warp and the weft. A method by which this result may be accomplished is illustrated in Fig. 2, wherein the warp threads are indicated by numeral 10, and the weft threads by numeral 11. As indicated in this figure, the sheet may be cut along a series of lines 2 similar to those previously described in connection with Fig. 1, but the lines 12 of Fig. 2 which define the working edges of the pieces, instead of extending at right angles to the lines 2, as is the case with lines 4 of Fig. 1, run obliquely across the sheet. Thus the working edges 12ª of the pieces are made up of the ends of both the warp and weft threads. The sheet then may be severed along further lines 5, similar to those previously described in connection with Fig. 1, the result being that the sheet, in the particular form of the invention illustrated in Fig. 2, is cut up into isosceles triangles instead of the right angled triangles shown in Fig. 1. It will be noted that in Fig. 2 the material of the lower left hand and upper right hand corners of the sheet is cut into pieces smaller than those which take up the remaining area of the sheet, but for the most part these smaller pieces are adapted for use in smaller sized buff wheels, so that no substantial waste of material is necessary to obtain working edges of the above character.

When the wheel is made up of pieces having their working edges inclined to both the warp and weft, the threads wear away usefully with less tendency toward unraveling or fraying, which would be the case if the working edges contained threads which run parallel thereto, which readily could be pulled out.

The buff wheel illustrated in Figs. 3 to 5 is made up of pieces as indicated in Fig. 2 in the form of isosceles triangles, the warp threads being parallel to the side $2^a$ of each piece and oblique to the cutting edge, while the weft threads 11 are perpendicular to such side $2^a$ and also oblique to the working edge.

As indicated in Figs. 3 and 5, several wheel sections or units made up of pieces as above described, may be assembled to make up a wheel having the desired width of cutting face. These figures show two of such units superposed to make up a wheel, the cutting edges of the same being oppositely inclined to the plane of the wheel to form a wheel face of herring bone appearance.

While certain embodiments of the invention have been described, it is obvious that many changes may be made therein without departing from the spirit of the invention as defined in the following claims.

I claim:

1. In the art of making buff wheels out of unit pieces cut from sheet material, the steps in the manufacture of the wheel which comprise severing a sheet of material along a series of lines parallel to one edge of the sheet, also severing the sheet along a series of parallel lines inclined to such edge, and along a further series of parallel lines inclined to both of said above-mentioned series of lines.

2. In the art of making buff wheels out of unit pieces cut from sheet material, the steps in the manufacture of the wheel which comprise severing a sheet of material along a series of lines parallel to one edge of the sheet, also severing the sheet along a series of parallel lines inclined to such edge, and along a further series of parallel lines inclined to both of said above-mentioned series of lines and passing substantially through the intersection points of the first-mentioned two series of lines.

3. In the art of making buff wheels out of unit pieces cut from sheet material, the steps in the manufacture of the wheel which comprise severing the material along a series of lines parallel to one edge of the sheet and along another series of parallel lines inclined to such edge whereby said two series of lines define parallelograms, and also severing the sheet along further lines extending respectively between lines defining opposite sides of the parallelograms.

4. In the art of making buff wheels out of triangular unit pieces cut from sheet material, the steps in the manufacture of the wheel which comprise severing a sheet of material along equally spaced parallel lines, also severing the material along further equally spaced parallel lines at an angle to said first-mentioned lines, and also along further lines extending through the intersection points of the aforesaid lines.

5. In the art of making buff wheels out of triangular unit pieces cut from sheet material, the steps in the manufacture of the wheel which comprise severing a sheet of woven material along parallel lines inclined to both the warp and weft to define the working edges of the triangular pieces, also cutting the sheet along parallel lines extending substantially parallel to the one edge of the sheet and along further parallel lines extending through the intersection points of the aforesaid lines to define the sides of the pieces, whereby the working edges of the triangles are inclined to both the warp and the weft.

6. In the art of making buff wheels out of polygonal unit pieces cut from sheet material, the steps in the manufacture of the wheel which comprise severing a sheet of material along a series of equally spaced parallel lines inclined to both the warp and weft to define the working edges of the polygonal pieces, also severing the sheet along equally spaced lines parallel to one edge of the sheet whereby said two series of lines define parallelograms each with two opposite sides inclined to both the warp and weft, and also severing the sheet along further lines extending between the inclined sides of the parallelograms to divide the latter into equal polygonal pieces.

In testimony that I claim the foregoing, I have hereunto set my hand this 8th day of September, 1921.

WESLEY F. HALL.